US007811083B2

(12) United States Patent
Böhringer et al.

(10) Patent No.: US 7,811,083 B2
(45) Date of Patent: Oct. 12, 2010

(54) ROTARY TUBULAR KILN USEFUL FOR THE PRODUCTION OF ACTIVATED CARBON AND HAVING A MODIFIED GEOMETRY OF THE ROTARY TUBE

(75) Inventors: Bertram Böhringer, Wuppertal (DE); Jann-Michael Giebelhausen, Rathenow (DE); Sven Fichtner, Brandenburg (DE)

(73) Assignee: Blucher GmbH, Erkrath (DE)

( * ) Notice: Subject to any disclaimer, the term of this patent is extended or adjusted under 35 U.S.C. 154(b) by 317 days.

(21) Appl. No.: 11/901,588

(22) Filed: Sep. 18, 2007

(65) Prior Publication Data

US 2008/0070178 A1 Mar. 20, 2008

(30) Foreign Application Priority Data

Sep. 19, 2006 (DE) .................. 10 2006 044 634
Nov. 7, 2006 (DE) .................. 10 2006 052 377

(51) Int. Cl.
*F27B 7/14* (2006.01)
(52) U.S. Cl. ..................... 432/118; 241/181
(58) Field of Classification Search ............... 432/118; 241/181, 183; 368/219, 220, 342, 343
See application file for complete search history.

(56) References Cited

U.S. PATENT DOCUMENTS

| 2,057,526 | A | * | 10/1936 | Horton ................ 34/130 |
| 2,721,069 | A | | 10/1955 | Old et al. ............. 263/21 |
| 2,939,693 | A | * | 6/1960 | Old et al. ............. 432/13 |
| 3,386,719 | A | * | 6/1968 | Martin ................ 266/130 |
| 4,317,291 | A | * | 3/1982 | Weststrate et al. ..... 34/103 |
| 4,597,737 | A | * | 7/1986 | Raghavan et al. ...... 432/197 |
| 4,725,350 | A | | 2/1988 | Smith ................ 208/408 |
| 4,961,588 | A | | 10/1990 | Brienza .............. 277/148 |
| 5,040,973 | A | | 8/1991 | Matter et al. ......... 432/103 |
| 5,551,870 | A | | 9/1996 | Gale ................. 432/115 |
| 7,172,414 | B2 | * | 2/2007 | Von Blucher .......... 432/118 |
| 7,354,266 | B2 | | 4/2008 | Miller et al. ......... 432/118 |
| 2001/0002308 | A1 | * | 5/2001 | Schleiffer et al. ..... 432/75 |
| 2006/0169857 | A1 | | 8/2006 | Hawkins et al. ....... 248/274.1 |
| 2007/0031772 | A1 | | 2/2007 | Von Blucher .......... 432/118 |

FOREIGN PATENT DOCUMENTS

| DE | 423 492 | 1/1926 | ............ 80/11 |
| DE | 2 325 781 | 11/1974 | |
| DE | 10 2004 036 109 A1 | 2/2006 | |
| DE | 20 2005 015 318 | 10/2006 | |
| GB | 263630 | 1/1927 | |

* cited by examiner

*Primary Examiner*—Gregory A Wilson
(74) *Attorney, Agent, or Firm*—Woodard, Emhardt, Moriarty, McNett & Henry LLP

(57) ABSTRACT

The invention has as subject matter a rotary tube, especially for a rotary tube kiln for the production of carbon, with several mixing elements arranged in the inner space of the rotary tube for a thorough mixing of a charged material. The rotary tube comprises a transitional area from a smaller inside cross section to a larger inside cross section of the rotary tube. The mixing elements are formed in the transitional area and/ or are arranged in such a manner that the charged material is transported during operation by the mixing elements toward the smaller inside cross section. The result is an excellent thorough axial mixing and blending of the charged material, which results in an increased homogeneity of the activated carbon produced.

16 Claims, 3 Drawing Sheets

ROTARY TUBULAR KILN USEFUL FOR THE PRODUCTION OF ACTIVATED CARBON AND HAVING A MODIFIED GEOMETRY OF THE ROTARY TUBE

CROSS REFERENCES TO RELATED APPLICATIONS

This application claims priority to German Patent Application No. DE 10 2006 044 634.8, filed Sep. 19, 2006, and also claims priority to German Patent Application No. DE 10 2006 052 377.6, filed Nov. 7, 2006, entitled "ROTARY TUBULAR KILN USEFUL FOR THE PRODUCTION OF ACTIVATED CARBON AND HAVING A MODIFIED GEOMETRY OF THE ROTARY TUBE". Both references are expressly incorporated by reference herein, in their entirety.

BACKGROUND OF THE INVENTION

The present invention relates to a rotary tube, especially for a rotary tube kiln for the production of activated carbon, in accordance with the disclosure as well as to a rotary tube kiln with such a rotary tube. Furthermore, the present invention relates to the use of this rotary tube and/or rotary tube kiln for the production of activated carbon and to a method for the production of activated carbon using this rotary tube and/or rotary tube kiln.

Activated carbon is the most-used adsorbent on account of its quite non-specific adsorbent properties. Legal requirements as well as the rising consciousness of a responsibility for the environment are resulting in an increasing need for activated carbon.

Activated carbon is being increasingly used in the civilian and in the military area. In the civilian area activated carbon is used, e.g., for the cleaning of gases, filter systems for air conditioning, automobile filters, etc. whereas in the military area activated carbon is used in all types of protective materials (e.g., gas masks, protective coverings and protective garments of all types such as, e.g., protective suits, etc.).

Activated carbon is generally obtained by carbonization (also designated synonymously as low-temperature carbonization, pyrolysis or coking) and by subsequent activation of suitable carbon-containing raw materials. Those raw materials are preferred that result in economically reasonable yields because the weight losses due to the splitting off of volatile components in the carbonization and to the roasting residue during activation are considerable. For further details one can refer to, e.g., H. v. Kienle and E. Bäder, Aktivkohle und ihre industrielle Anwendung [Activated Carbon and Its Industrial Use], Enke Verlag Stuttgart, 1980.

The nature of the activated carbon produced, fine-pored, or coarse-pored, solid or brittle, is a function of the carbon-containing raw material. Customary raw materials are, e.g., coconut shells, wood chips, peat, hard coal, tars, and in particular plastics such as, e.g., sulfonated polymers, that play a large part, among other things, in the production of activated carbon in the form of granules or spherules.

Activated carbon is used in various forms: powdered carbon, splint carbon, granular carbon, molded carbon and also, since the end of the '70s, granular and spherical activated carbon (so-called "granular carbon" or "spherical carbon"). Granular carbon, especially spherical activated carbon, has a number of advantages over other forms of activated carbon such as powdered carbon, splint carbon and the like, that make it valuable or even absolutely necessary for certain applications. It is flowable, enormously wear-resistant and dust-free and very hard. Granular carbon, especially spherical carbon, is very much in demand on account of its special form and also on account of the extremely high wear-resistance for special areas of use, e.g., surface filter materials for suits for protection against chemical poisons or filters for low concentrations of noxious substances in large amounts of air.

In most instances suitable polymers are used as starting material in the production of activated carbon, especially granular carbon and spherical carbon. Sulfonated polymers, especially sulfonated divinylbenzene-crosslinked styrene polymers are preferably used, in which case the sulfonation can also be achieved in situ in the presence of sulfuric acid or oleum. Suitable raw materials are, e.g., ion-exchange resins or their precursors, which are usually divinylbenzene-crosslinked polystyrene resins. In the case of finished ion exchangers, the sulfonic acid groups are already present in the material and in the case of the ion exchanger precursors, they must still be introduced by sulfonation. The sulfonic acid groups have a decisive function since they play the part of a crosslinking agent in that they are split off in the carbonization. However, a particular disadvantage and problem is constituted by the large amount of released sulfur dioxide, as well as associated corrosion problems, among other things, in the production equipment.

Activated carbon is usually produced in rotary tube kilns. These have, e.g., a charging area for the providing of raw material at the beginning of the kiln and a discharge area for the end product at the end of the kiln.

In the traditional processes for the production of activated carbon in accordance with the state of the art in discontinuous production, the carbonization and the subsequent activation take place in a single rotary tube.

During the carbonization, which can be preceded by a phase of pre-carbonization or pre-low-temperature carbonization, the conversion of the carbon-containing raw material to carbon takes place; that is, in other words, the raw material is carbonized. During the carbonization of the previously cited organic polymers based on styrene and divinylbenzene that contain crosslinking functional chemical groups, which result during their thermal decomposition in free radicals and therefore in crosslinkings, especially sulfonic acid groups, the functional chemical groups, in particular sulfonic acid groups, are destroyed under the splitting-off of volatile components such as, in particular, $SO_2$, and free radicals are formed that bring about a strong crosslinking without which there would be no pyrolysis residue (=carbon). Suitable initial polymers of the previously-cited type are, in particular, ion-exchange resins (e.g., cation-exchange resins or acidic ion-exchange resins, preferably with sulfonic acid groups, e.g., cation-exchange resins based on sulfonated styrene/divinylbenzene copolymers) or their precursors (that is, non-sulfonated ion-exchange resins that must still be sulfonated before or during the carbonization with a suitable sulfonation agent such as, e.g., sulfuric acid and/or oleum). In general, the pyrolysis is carried out under an inert atmosphere (e.g., nitrogen) or possibly under a slightly oxidizing atmosphere. It can likewise be advantageous to add a rather small amount of oxygen, especially in the form of air (e.g., 1 to 5%), to the inert atmosphere during the carbonization, especially at rather high temperatures (e.g., in a range of approximately 500° C. to 650° C.) in order to bring about oxidation of the carbonized polymer skeleton and to facilitate the subsequent activation in this manner.

The carbonization is then followed by the activation of the carbonized raw material. The basic principle of the activation consists in degrading selectively and purposefully under suitable conditions a part of the carbon generated during the low-temperature carbonization. This produces numerous pores, cracks and fissures and the surface of the activated carbon increases considerably relative to the unit of mass. Thus, a purposeful calcining of the carbon is carried out during the activation. Since carbon is degraded during the activation, a partial, considerable substance loss occurs during the procedure and is equal to an increase in the porosity under optimal conditions and signifies an increase in the inner surface (pore volume) of the activated carbon. Therefore, the activation takes place under selective conditions that oxidize in a controlled manner. Customary activation gases are in general oxygen, especially in the form of air, water vapor and/or carbon dioxide as well as mixtures of these activation gases. Inert gases (e.g., nitrogen) can be added, if necessary, to the activation gases. In order to achieve a technically sufficiently high reaction rate, the activation is carried out in general at relatively high temperature, especially in a temperature range of 700° C. to 1,200° C., preferably 800° C. to 1,100° C. This places high requirements on the temperature resistance of the rotary tube material.

It is in addition necessary in the framework of the production of activated carbon in rotary tube kilns that a thorough mixing of the carbon-containing or carbonized raw material take place in the rotary tube with the carbonization and the activation, because a thorough mixing of the raw material ensures that, e.g., the acidic reaction products split off during the carbonization can be uniformly and effectively removed from the carbon-containing raw material. A thorough mixing of the carbonized raw material is also desirable in the method step of activation since, given the background of the production of a homogeneous active carbon material, a uniform contact of the carbonized raw material with the activation gases is desirable. Therefore, a thorough mixing of the raw material in the framework of the production of activated carbon in rotary tube kilns can make a significant contribution to the obtention of a homogeneous and efficient activated carbon product.

However, a thorough mixing of the raw material as is ensured in particular by a thorough axial mixing, that is, a thorough mixing or mixing along the longitudinal axis of the rotary tube, is not always ensured to a sufficient extent by traditional rotary tubes of the state of the art. In particular, such rotary tubes of the state of the art do not have a good thorough axial mixing of the raw material. This serious disadvantage of the rotary tubes of the state of the art can also be traced back to the cause that such rotary tubes have a constant inside diameter and that the rotary tubes therefore are designed solely in a cylindrical form. The mixing elements that are occasionally provided in the rotary tubes of the state of the art and arranged in the inside space of the rotary tubes cannot make a significant contribution toward ensuring an intense axial mixing of the raw material or charged material in this connection, in particular on account of their limited dimensions and their arrangement inside the cylindrical tube. A concrete coordination between the rotary tube geometry on the one hand and arrangement and formation of the mixing elements on the other hand, given the background of improving the axial mixing of the raw material for obtaining a more homogeneous end product, is not provided in the state of the art. Thus, rotary tubes of the state of the art have the disadvantage of an thorough axial mixing of the raw material or charged material that is not always optimal, so that as a consequence the resulting end product is not always optimized as regards its homogeneity.

Therefore, given this technological background, the present invention has the problem of making an apparatus or a rotary tube available that is suitable in particular for the production of activated carbon and with which the previously described disadvantages of the state of the art are at least partially avoided or at least are attenuated. In particular, a rotary tube should be made available that results in an improved thorough axial mixing of the raw material or of the charged material so that especially homogeneous activated carbon materials can be produced as end products with a uniformly great pore volume with one of such rotary tubes.

In order to solve the previously described problem, the present invention suggests a rotary tube in accordance with the disclosure. Further advantageous embodiments constitute subject matter of the dependent claims.

Further subject matter of the present invention is constituted by a rotary tube kiln according to the disclosure that comprises the rotary tube in accordance with the invention.

Finally, further subject matter of the present invention is constituted by the use of the rotary tube or rotary tube kiln in accordance with the invention to produce activated carbon in accordance with the disclosure, that is, more precisely, a method for the production of activated carbon by carbonization and the subsequent activation of carbon-containing raw materials, which method is carried out in a rotary tube or rotary tube kiln in accordance with the present invention.

Therefore, subject matter of the present invention, in accordance with a first aspect of the present invention, is a rotary tube, in particular for a rotary tube kiln for the production of activated carbon with several mixing elements arranged in the inner space of the rotary tube for thoroughly mixing a charged material, which rotary tube comprises a transitional area from a smaller inside cross section to a larger inside cross section of the rotary tube, in which mixing elements are formed or arranged in the transitional area in such a manner that the charged material is transported during operation by the mixing elements to the smaller inside cross section.

The applicant surprisingly found that in particular the thorough axial mixing or blending of the charged material or of the raw material for the production of activated carbon can be considerably improved if the rotary tube has a transitional area from a smaller inside cross section to a larger inside cross section as well as mixing elements that transport the charged material during the operation of the rotary tube to the smaller inside cross section. At the same time an optimal radial or horizontal thorough mixing of the charged material is of course also achieved.

In this manner a rotary tube is created that results in an excellent thorough axial mixing, that is, in an excellent thorough mixing of the charged material along the longitudinal axis of the rotary tube of the invention, during which it is ensured that during the thorough mixing no unmixing or dehomogenization, that is, no splitting up of the charged material into fractions of larger and smaller particles and no grinding of the charged material takes place, which results in better homogeneity of the charged material and therewith also of the activated carbon resulting from it.

Therefore, a basic principle of the present invention is the fact that due to the special positioning and design of the mixing elements in the transitional area, a transport process by the mixing elements results to a certain extent that is counter to the transport process in the direction of the slope of the rotary tube and that results from the different inside cross sections of the transitional area. In other words, the mixing elements, especially the turning baffles, transport the charged material to a certain extent in the direction counter to the slope of the transitional area, which results in a thorough axial mixing of the charged material. This effectively avoids in particular a separation of the charged material into large or small particles and ensures a uniform contacting of the charged material, e.g., with the oxidizing atmosphere in the framework of the activation step, as a result of which an especially homogenous end product results.

Furthermore, the rotary tube of the invention can be equipped in accordance with an especially preferred embodiment of the invention with reinforcement elements on the outside in order to heighten the mechanical stability, in particular the ability to resist deformations at high operating temperatures. According to a further preferred embodiment of the invention, it can be additionally provided that the mixing elements are fastened or welded to the outside of the rotary tube, and are preferably connected to the rotary tube exclusively by the outside fastening or welding in order to protect the welding connection from the corrosive conditions in the internal space of the rotary tube and from the high operating temperatures prevailing there.

Further advantages, properties, aspects, particularities and features of the present invention result from the following description of a preferred exemplary embodiment shown in the drawings.

BRIEF SUMMARY

A rotary tube, especially for a rotary tube kiln for the production of carbon, with several mixing elements arranged in the inner space of the rotary tube for a thorough mixing of a charged material. The rotary tube comprises a transitional area from a smaller inside cross section to a larger inside cross section of the rotary tube. The mixing elements are formed in the transitional area and/or are arranged in such a manner that the charged material is transported during operation by the mixing elements toward the smaller inside cross section. The result is an excellent thorough axial mixing and blending of the charged material, which results in an increased homogeneity of the activated carbon produced.

One object of the present disclosure is to describe an improved rotary kiln for the production of activated carbon.

DETAILED DESCRIPTION

Figure 1:
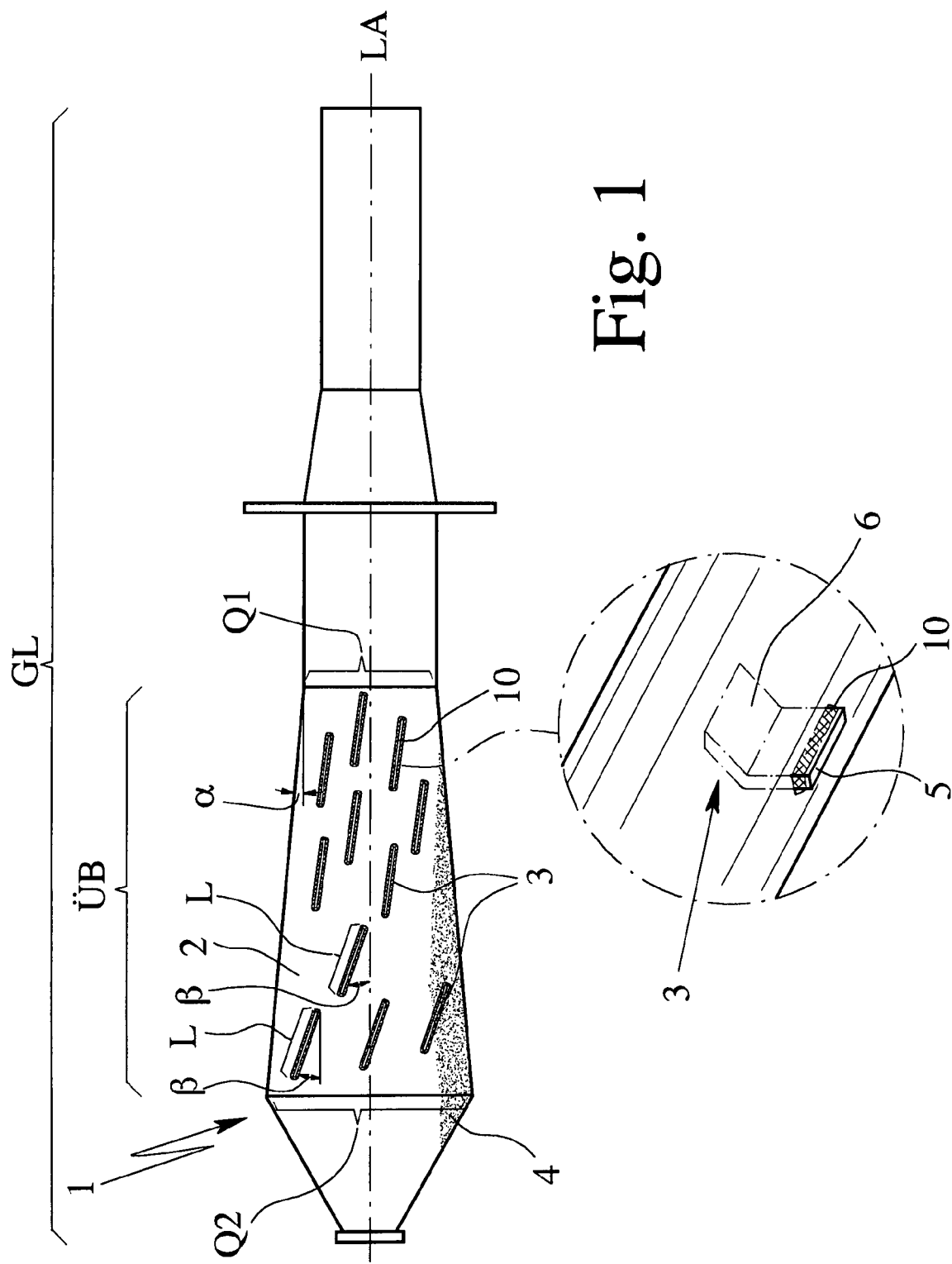
FIG. 1 shows a schematic lateral view of a rotary tube in accordance with a preferred exemplary embodiment of the present invention with an enlarged section of a partial area of the rotary tube.

For the purposes of promoting an understanding of the disclosure, reference will now be made to the embodiments illustrated in the drawings and specific language will be used to describe the same. It will nevertheless be understood that no limitation of the scope of the disclosure is thereby intended, such alterations and further modifications in the illustrated device and its use, and such further applications of the principles of the disclosure as illustrated therein being contemplated as would normally occur to one skilled in the art to which the disclosure relates.

Figure 3:
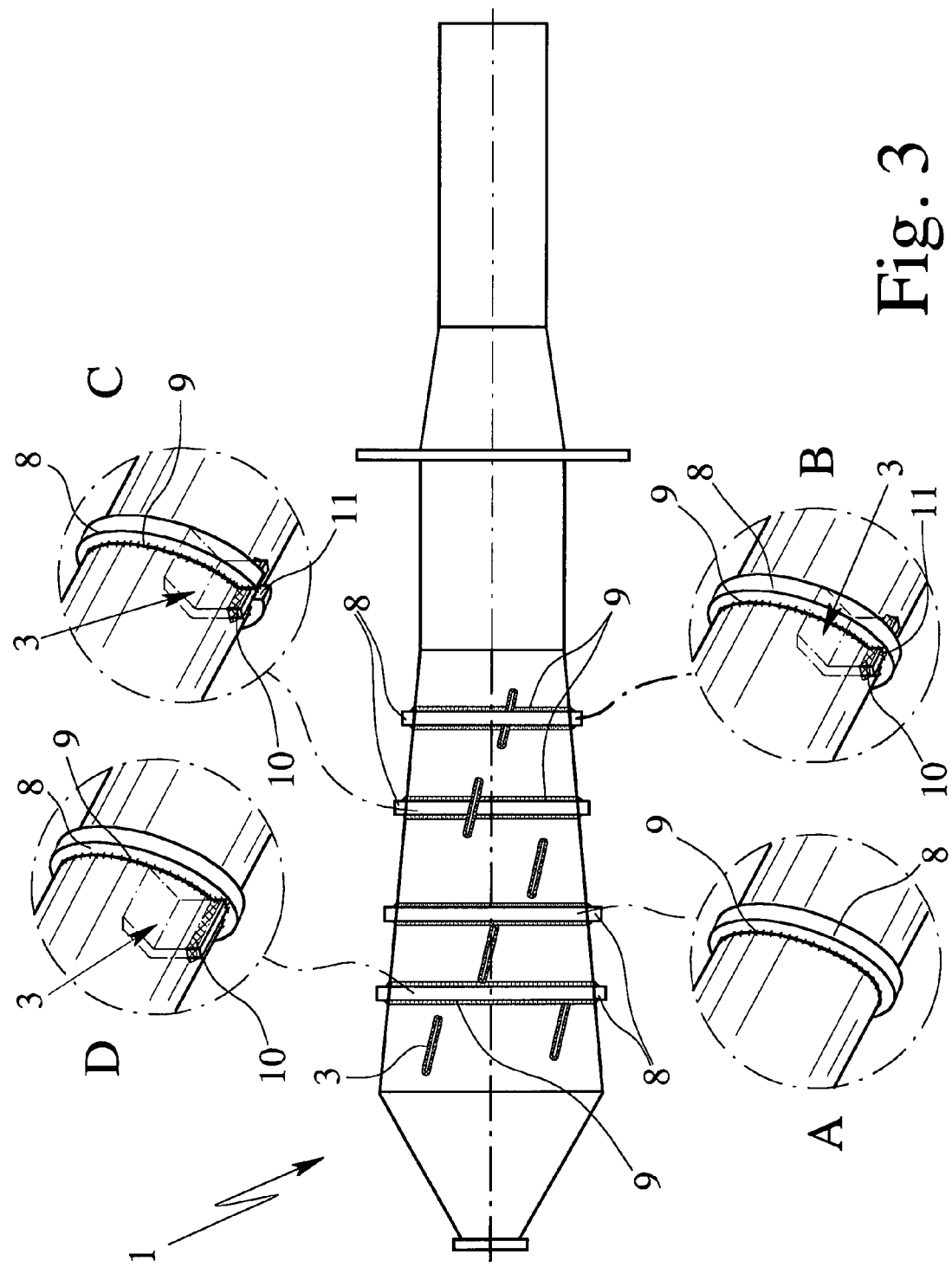
FIGS. 3A-D show a schematic lateral view of a rotary tube in accordance with a further preferred embodiment of the invention with sections A), B), C) and D) of variously designed embodiments of the reinforcement elements.

FIGS. 1 and 3 show a rotary tube 1 in accordance with the present invention that can be used for a rotary tube kiln for producing activated carbon. As can be gathered from FIGS. 1 and 3, rotary tube 1 in accordance with the invention comprises several mixing elements 3 arranged in inner space 2 of rotary tube 1 for thoroughly mixing a charged material 4. Rotary tube 1 in accordance with the invention is distinguished in that it comprises a transitional area ÜB from a smaller inside cross section Q1 to a larger inside cross section Q2 of rotary tube 1, and in that mixing elements 3 are formed or arranged in transitional area ÜB in such a manner that charged material 4 is transported during operation by mixing elements 3 toward smaller inside cross section Q1.

As previously described, an especially thorough axial mixing or blending of the charged material is achieved by the special design of transitional area ÜB with a smaller and a larger inside cross section Q1, Q2, as well as by the special design or arrangement of mixing elements 3 in transitional area ÜB, which effectively prevents an unmixing of the charged material, especially a separation of large and small particles and a dehomogenization of the charged material. An activated carbon with excellent properties is obtained with the aid of rotary tube 1 in accordance with the invention by virtue of the better and uniform removal of reaction products during the carbonization of the charged material and of the improved contacting of the charged material with the oxidative atmosphere during the activation process.

The thorough axial mixing is achieved in particular in that the mixing elements, in particular in the form of turning baffles, e.g., as rotating sheets or transport sheets, which are also designated synonymously as material guide sheets, create to a certain extent a transport process counter to the direction of transport in the transitional area, namely, in a direction counter to the slope of the transitional area during the operation of the rotary tube.

On account of the improved thorough axial mixing, an activated carbon material with a uniform pore structure and a surface with a unified size results by using the rotary tube 1 of the invention in the framework of production of activated carbon. This is established, without wishing to determine a certain theory, by the fact that small parts or particles of the charged material with a larger particle diameter move more rapidly in the vicinity of the surface, that is, in the area of the inside wall of the rotary tube, as result of which an enlarged contact surface of the charged material with the surrounding atmosphere results to a certain extent under the formation of a fluidized bed.

The term "operation" (that is, operation of the rotary tube kiln) is to be understood in such a manner in the context of the present invention that a turning or rotation of the rotary tube in a defined direction, e.g., clockwise, is present during the production of activated carbon.

As concerns the concept "longitudinal axis" (longitudinal axis of the rotary tube), it similarly denotes the turning or rotary axis of the rotary tube.

FIGS. 1 and 3 show a preferred embodiment in accordance with the invention, in which the transitional area ÜB of rotary tube 1 is designed like a cone and/or truncated cone. In this connection, transitional area ÜB of rotary tube 1 can be designed in particular like a cone in the section along the longitudinal axis. In other words, transitional area ÜB of rotary tube 1 can be conically enlarged or conically widened. This produces a first transport process of the charged material starting from smaller inside cross section Q1 in the direction of larger inside cross section Q2 during the operation of the rotary tube.

Figure 2:
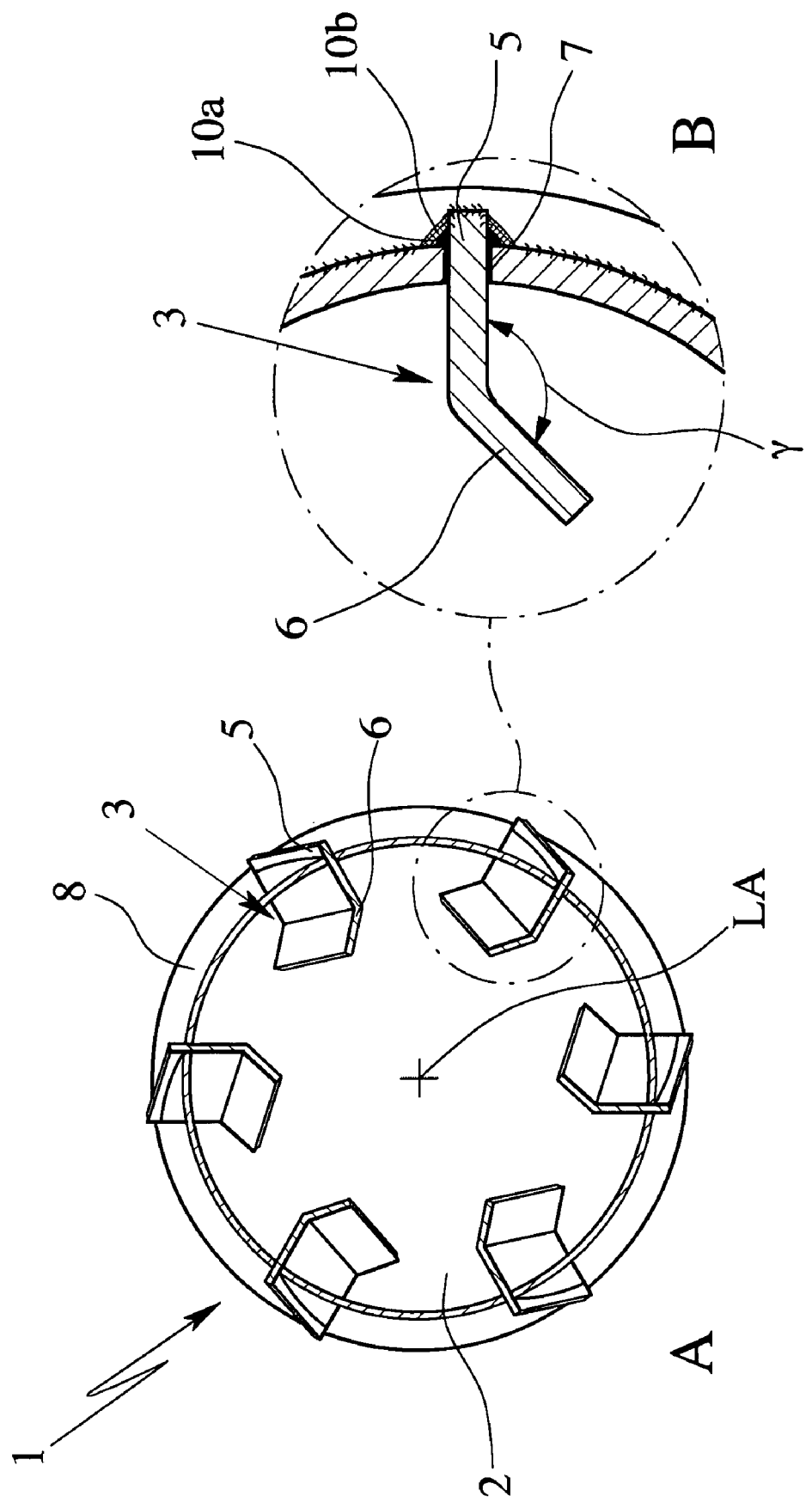
FIG. 2A shows a radial cross section through the rotary tube.
FIG. 2B shows an enlarged section of the area characterized in FIG. 2A.

FIGS. 1 and 2 furthermore illustrate that according to a further embodiment of the invention, the ends of transitional area ÜB of rotary tube 1 are provided with cylindrical sections and/or with conical sections running in particular counter to transitional area ÜB of rotary tube 1 that prevent, like a "cover," an exiting of charged material 4 from rotary tube 1 during operation and/or are intended to ensure a good supply of charged material 4 to transitional area ÜB.

As concerns the design of transitional area ÜB of rotary tube 1, it can extend up to 90%, especially up to 80%, preferably up to 70% over the entire length GL of rotary tube 1. In particular, it can be provided in accordance with the invention that transitional area ÜB of rotary tube 1 extends over 10 to 90%, in particular 20 to 80%, and preferably 30 to 70% of the entire length GL of rotary tube 1. This makes possible an optimal and intense thorough mixing of charged material 4 in the axial direction (in addition to the radial and horizontal thorough mixing achieved by rotation, that is of course achieved in a similar manner).

Furthermore, as concerns transitional area ÜB, it can have, as can be seen in FIG. 1, an angle of inclination α of the surface of transitional area ÜB to longitudinal axis LA of rotary tube 1, relative to its two-dimensional projection plane, in a range of 1° to 15°, in particular 2° to 10°, and preferably 3° to 7°.

A person skilled in the art is capable at all times of selecting the previously cited parameters relative to the formation of transitional area ÜB of rotary tube 1 in such a manner that an optimization of the thorough axial mixing of charged material 4 results, in particular in conjunction with the specific arrangement of mixing elements 3.

As concerns mixing elements 3, they can be plate-shaped or scoop-shaped. According to the invention a scoop-shaped design of mixing elements 3 is preferred, in particular as is represented in the sectional enlargement for FIG. 1 and in FIGS. 2A, 2B and FIG. 3, because the scoop-shaped design of mixing elements 3 can further increase the amount of charged material 4 to be transported and in particular during the operation of rotary tube 1 a premature sliding off of charged material 4 from mixing elements 3 is avoided. The scoop-like design of mixing elements 3 ensures in particular a reliable and intensive thorough mixing and rotation of charged material 4. For example, sheets, especially bent sheets (angled sheets) can be used as mixing elements 3 that thoroughly mix charged material 4 in the manner of a scoop. This is known as such to the person skilled in the art.

According to an especially preferred embodiment of the present invention, mixing elements 3 are inclined, especially at least substantially in sections and preferably entirely, to longitudinal axis LA of rotary tube 1. In this connection it is preferred according to the invention that the angle of positioning or inclination β of mixing elements 3 or of their sections to longitudinal axis LA of rotary tube 1, relative to its two-dimensional projection plane, be designed as a function of the position of mixing elements 3 along longitudinal axis LA of rotary tube 1. It can be provided in this connection that, as is shown in FIG. 1, mixing elements 3 in the area of smaller inside cross section Q1 of transitional area ÜB have a smaller angle of positioning or inclination β than those mixing elements 3 that are arranged in the direction of larger inside diameter Q2 of transitional area ÜB. This can achieve to a certain extent a position-specific graduation of the thorough mixing process along longitudinal axis LA of rotary tube 1, which results in a further optimization of the thorough mixing process. It can also be provided in this connection that the thorough axial mixing be increased locally, e.g. in the area of heating elements.

As concerns the previously defined angle of positioning or inclination β of mixing elements 3, it can be in a range of 1° to 45°, in particular 2° to 35°, preferably 3° to 30°, especially preferably 4° to 25°, and quite especially preferably 5° to 20°.

Furthermore, mixing elements 3 can have lengths L, in particular relative to their orientation to longitudinal axis LA of rotary tube 1, in a range of 1 to 500 mm, especially 20 to 450 mm, preferably 50 to 400 mm, especially preferably 75 to 350 mm, quite especially preferably 100 to 300 mm.

As concerns the concrete design of the mixing elements, the angle of positioning or inclination β an be formed or selected to be a function of the shape mixing elements 3, in particular of lengths L of mixing elements 3, in particular relative to their orientation to longitudinal axis LA of rotary tube 1.

Thus, on the whole, the invention can provide that mixing elements 3 can be coordinated as regards their design in such a manner with rotary tube 1 as such or its transitional area ÜB that an optimal thorough axial mixing of charged material 4 results. In other words, the particular components of rotary tube 1 of the invention can be coordinated with each other given the background of ensuring a good and optimized thorough axial mixing of charged material 4.

Thus, e.g., the angle of positioning or inclination β of mixing elements 3 can be formed or selected as a function of the shape of mixing elements 3, especially of lengths L of mixing elements 3. In this regard the invention can provide that angle of positioning or inclination β be correspondingly smaller at a larger length L of mixing elements 3 or that angle of positioning or inclination β be correspondingly larger at a smaller length L of mixing elements 3 in order to ensure a defined axial transport of the charged material to the smaller inside cross section of transitional area ÜB. In other words, a shorter length L of mixing element 3 can be compensated by a larger angle of positioning or inclination β and vice versa.

Thus, in this connection the design of mixing elements 3 can also be coordinated with the design of transitional element ÜB, especially as regards its ratio of smaller inside cross section Q1 to the larger inside ratio Q2, with the angle of inclination α of transitional area ÜB (that is, the actual conical angle) and/or with its length. Thus, it can be provided that, without wishing to be limited to this, given a large angle of inclination α of the surface of transitional area ÜB to longitudinal axis LA, the angle of positioning or inclination β of mixing elements 3 or the lengths L of mixing elements 3 are designed correspondingly smaller. In other words, mixing elements 3 can be designed, as regards their lengths L and angle of positioning or inclination β, as a function of the slope, of the length and of the shape of transitional area ÜB and mixing elements 3 can likewise be designed differently along longitudinal axis LA of rotary tube 1 in transitional area ÜB of rotary tube 1. As concerns the design of rotary tube 1 in accordance with the invention, it can also be considered in particular that transitional area ÜB of rotary tube 1 be designed taking into consideration the maximal volume loss and the resulting volume flow of charged material 4.

As is shown in the sectional enlargement for FIG. 1 and in FIGS. 2A and 2B, as well as in FIGS. 3B to 3D, mixing elements 3 can comprise fastening sections 5 that preferably serve to fix mixing elements 3 to the wall of rotary tube 1 of the invention. In addition, mixing elements 3 can also comprise scoop sections 6 that extend into the inner space 2 of rotary tube 1 and, as previously described, serve to transport the charge material and therefore have a scoop function to a certain extent.

In this connection it is possible in accordance with the invention for scoop sections 6 to be bent, especially at their free ends, and in particular for scoop sections 6 to have an angle γ in a range of 90° to 175°, especially 100° to 160°, preferably 110° to 150°. According to an especially preferred embodiment of the invention, angle γ is 135°. In this instance mixing elements 3 are designed, so to speak, as angular sheets ("turning sheets").

According to another embodiment of the invention, mixing elements 3 can extend radially through rotary tube 1. In this connection it can be provided that mixing elements 3 are welded on the outside to rotary tube 1, in which instance it is provided in particular that rotary tube 1 comprises perforations 7 to receive fastening sections 5 of mixing elements 3 and that fastening sections 5 are welded to rotary tube 1 on its outside by welding connection 10.

Fastening sections 5 of mixing elements 3 can therefore be inserted, so to speak, through perforations 7 in the wall of the rotary tube and welded on its outside. This avoids in particular exposure of the welding sites or welding connections 10 to the aggressive conditions prevailing in inner space 2 of the rotary tube in the operating state during the production of activated carbon—corrosive gases during the carbonization and high temperatures during the activation. As a result of the fact that the welding sites or welding connections 10 are exposed in this manner to a distinctly lesser load, their service life is clearly increased. In addition, as a result of the outside welding, maintenance is decisively facilitated: the welding sites between mixing elements/rotary tube can be readily checked and serviced from the outside and improved or repaired as required. Therefore, maintenance can be performed even in the operating state of the rotary tube.

Furthermore, in this manner fusing materials (also synonymous with welding materials or welding matter) can be used that ensure an optimal and tight connection between mixing elements 3 and rotary tube 1 and that would otherwise not readily permanently resist the corrosive high-temperature conditions in the interior of rotary tube 1 that prevail during operation.

In this connection the rotary tube kiln of the invention can be designed in such a manner that mixing elements 3 are connected exclusively by outside welding 10 to the rotary tube wall. Further fastening means such as screws, bolts, interior welding connections and the like are not necessary in accordance with the invention.

Perforations 7 in the wall of rotary tube 1, that serve to receive fastening sections 5 of mixing elements 3, are generally designed like slots. Then, fastening sections 5 of mixing elements 3 can be inserted through these in particular slot-shaped perforations 7, advantageously in such a manner that that fastening sections 5 project, that is stand up a little from the outer jacket of rotary tube 1 in order that they can be better welded. This can be seen in FIG. 1 (sectional enlargement) as well as in FIGS. 2A and 2B.

As for fastening sections 5 of mixing elements 3, various embodiments are possible for ensuring a reliable connection of fastening sections 5 to rotary tube 1: for example, it is possible for fastening sections 5 of mixing elements 3 to extend over the entire contact length or circumferential length of mixing elements 3; in this instance fastening sections 5 are inserted completely through perforations 7 in the wall of rotary tube kiln 1 and such an embodiment is shown in the sectional enlargement of FIG. 1. Alternatively, it is possible for fastening sections 5 to be shorter than the contact length or circumferential length of mixing elements 3 (not shown). In the last-cited instances mixing elements 3 can comprise, e.g., a shoulder at the transition to fastening section 5, which shoulder serves in particular for resting on the inside or inside wall of rotary tube 1. It is also possible for mixing elements 3 to each have several fastening sections 5 that engage in different perforations 7 (not shown).

As for mixing elements 3, in particular turning sheets as such, as well as their welding to the wall of the rotary tube, reference can be made in particular to DE 10 2004 036 109 A1 or the parallel U.S. patent application with the U.S. Ser. No. 11/176,032 with the application date of Jul. 7, 2005, which issued Feb. 6, 2007 as U.S. Pat. No. 7,172,414, which is incorporated by reference in its entirety.

As for rotary tube 1 and mixing elements 3, they advantageously consist of high-temperature and corrosion-resistant material, in particular steel, because rotary tube 1 as well as mixing elements 3 must resist the extremely corrosive conditions of the carbonization phase and the high-temperature conditions of the activation phase during the production of activated carbon. Examples for suitable high-temperature and corrosion-resistant steels from which rotary tube 1 and/or mixing elements 3 can be produced are high-alloy steels, that is, steels with more than 5% alloy elements. Examples for this are high-alloy chromium steels and chromium/nickel steels, preferably with a chromium portion and/or nickel portion over 10%, especially over 15%, and especially preferably over 20% relative to the alloy. Ferritic or ferritic-austenitic steel with good corrosion and high-temperature behavior are preferably used as material for the production of rotary tube 1 and/or of mixing elements 3.

As is apparent from FIG. 1 (sectional enlargement) and FIG. 2B, the external welding of fastening sections 5 of mixing elements 3 to rotary tube 1 takes place via welding section 10. This welding section 10 advantageously has at least two welding layers or two welding seams 10a, 10b. The two welding layers or welding seams 10a, 10b are advantageously arranged superposed or applied over each other. This produces double welding layers or welding seams 10a, 10b. This has the advantage that different materials can be used for the different welding layers 10a, 10b. For example, in this manner welding materials with a different temperature resistance and corrosion resistance can be used or combined with each other, in which instance the inner welding layer 10a should advantageously be resistant to corrosion and high temperatures, whereas corrosion resistance is not required to the same extent for the outer welding layer 10b. The use of several welding layers or welding seams 10a, 10b achieves a tight, especially gas-tight, and reliable welding of fastening section 5 of mixing elements 3 to rotary tube 1. According to a special embodiment of the present invention, one of the two welding layers 10a, 10b is austenitic, especially completely austenitic, and the other one is ferritic-austenitic. It is especially preferred that the inner welding layer 10a be austenitic, especially completely austenitic, and the outer welding layer 10b ferritic-austenitic. According to a preferred embodiment, the welding takes place by build-up welding (e.g., by electrode welding). In general, the welding takes place in such a manner that welding section 10 is at least substantially gas-tight.

Furthermore, the invention can provide that rotary tube 1 be provided on the outside with at least one reinforcement element 8 for stabilizing rotary tube 1 during operation. Thus, a rotary tube 1 with reinforcement elements 8 can be made available that has a stable shape, in particular under extreme temperature conditions, and a high degree of resistance to deformations during operation because the mechanical stability or the shape stability of rotary tube 1 during operation, in particular even under extreme conditions (such as occur, e.g., during the production of activated carbon), can be significantly improved if rotary tube 1 is provided on its outside or outer wall with at least one reinforcement element 8, preferably with a plurality of reinforcement elements 8.

In this manner a rotary tube 1 is created that can better resist mechanical deformations and is also more resistant to strong pressure differences and fluctuations in pressure and thus also has a stable shape under operating conditions. Consequently, rotary tube 1 in accordance with the invention has, in accordance with this embodiment of the invention, an additionally improved service life with a decreased tendency for the material to become prematurely fatigued. As a consequence, the carrying-out of the process and process control are facilitated.

Reinforcement element 8 can be designed in such a manner that rotary tube 1 is stabilized in its cross section and/or in its longitudinal extent. As can be seen in FIGS. 2 and 3, reinforcement element 8 can extend peripherally around rotary tube 1. Reinforcement element 8 can extend, e.g., perpendicularly or inclined to the axis of rotation of rotary tube 1, whereby a reinforcement and stabilization of the cross section of rotary tube 1 is realized. As concerns the concept "peripherally," it refers to a circumferential arrangement of reinforcement element 8 on the outside or outer wall of rotary tube 1.

As concerns the arrangement of reinforcement element 8, it is arranged coaxially to rotary tube 1 in accordance with a preferred embodiment of the invention, as is shown in FIGS. 2 and 3. Thus, reinforcement element 8 and rotary tube 1 are arranged concentrically to one another in their cross sectional area.

Furthermore, FIG. 2A as well as sectional enlargements (A) to (D) of FIG. 3 illustrate that reinforcement element 8 extends preferably at least substantially completely over the circumference of rotary tube 1. However, it is likewise possible in the scope of the present invention for reinforcement element 8 to extend in sections, e.g., in segments, over the circumference of rotary tube 1.

FIGS. 2 and 3A show that reinforcement element 8 can be designed in accordance with an especially preferred embodiment of the invention in an annular shape. Reinforcement element 8 can be designed, e.g., as an annular flange or like a hollow cylinder. In order to ensure a close and stabilizing contacting of reinforcement element 8 on the outside wall of rotary tube 1, the inside diameter of reinforcement element 8 should correspond at least substantially to the outside diameter of rotary tube 1. That means that the inside diameter of the reinforcement rings in transitional area ÜB increases in the direction of the larger inside cross section Q2.

The present invention is not limited to an annular or hollow-cylindrical design of optionally provided reinforcement element 8. Thus, it can also be provided for example, that reinforcement element 8 is designed in the form of ribs or helically. In the case of a helical design of reinforcement element 8, reinforcement element 8 extends to some extent in the longitudinal direction of rotary tube 1 around its circumference; also in this embodiment, which is not shown in the figures, reinforcement element 8 and rotary tube 1 can run and be arranged coaxially to one another.

According to a further embodiment of the invention, reinforcement element 8 can extend axially along the rotary tube 1, which achieves in particular a stabilizing of rotary tube 1 in its longitudinal extension. In this case reinforcement element 8 can extend in particular over the entire length of rotary tube 1. As concerns the axial arrangement of reinforcement element 8, reinforcement element 8 can be arranged in this embodiment, which is not shown in figures, e.g., parallel to the axis of rotation or longitudinal axis of rotary tube 1 on the outer wall of rotary tube 1.

As FIG. 3 shows, reinforcement 8 has as such, e.g., an at least substantially rectangular cross section, which cross section of reinforcement element 8 refers to the sectional surface according to a section in the radial plane of reinforcement element 8. The height and width of the cross section of reinforcement element 8 can vary within wide limits. According to the invention, the height and width of the cross section of reinforcement element 8 can preferably be, e.g., 0.5 cm to 10 cm, preferably 0.5 cm to 8 cm, with preference of 1 cm to 6 cm, especially preferably 1 cm to 5 cm. According to the invention the cross section can be, e.g., square; however, it is likewise possible and preferred by the invention that the height and the width of the cross section of reinforcement element 8 be different. It is preferred in this instance that the height of the cross section of reinforcement element 8 be greater than its width. However, it is also possible according to the invention for the cross section of reinforcement element 8 to be at least substantially circular or round, e.g., like a circularly closed steel wire.

According to the invention, the optionally provided reinforcement element 8 is preferably welded to rotary tube 1 via a welding connection 9, as can be seen in FIGS. 3A to 3D. This ensures a permanent connection between reinforcement element 8 on the one hand and rotary tube 1 on the other hand. According to a preferred embodiment of the invention, welding connection 9 runs along a contact line of reinforcement element 8 with rotary tube 1 without interruption. However, a sectional or segment-like welding connection 9 of reinforcement element 8 with rotary tube 1 or a punctiform design of welding connection 9 for a permanent fastening of reinforcement element 8 to rotary tube 1 is alternatively possible.

According to the invention it can be provided that welding connection 9 comprises at least two welding layers 9a, 9b (not shown). Thus, in this manner a, as it were, double welding connection 9 with welding layers 9a, 9b is produced. Different materials can be used for the different welding layers 9a, 9b. For comments in this regard, the above comments concerning the welding of fastening sections 5 of mixing elements 3 to rotary tube 1 can be referenced.

Further connection types between reinforcement element 8 on the one hand and rotary tube 1 on the other hand are sufficiently known to a person skilled in the art: for example, screws, rivets and the like can be cited in this regard. However, according to the invention, a connection between reinforcement element 8 and rotary tube 1 is preferred that does not penetrate through the casing of rotary tube 1.

As can be seen in FIG. 3, rotary tube 1 can also comprise a plurality of reinforcement elements 8. The number of reinforcement elements 8 can be in particular two to ten, preferably two to eight, and especially preferably three to six. According to the invention, it is preferred that reinforcement elements 8 be spaced uniformly or equidistant from each other. Likewise, an irregular spacing of reinforcement elements 8 can be provided in accordance with the application or as conditions require by the individual instance: thus, e.g., in the case of particularly stressed sections of rotary tube 1, a greater number of reinforcement elements 8 per unit of length of rotary tube 1 can be fastened.

Reinforcement element 8 can consist of metal, preferably steel. According to the invention, reinforcement element 8 can preferably consist of the same material as rotary tube 1. Reinforcement element 8 or rotary tube 1 can especially preferably consist of steel resistant to high temperatures. Due to the same material, reinforcement element 8 as well as rotary tube 1 have at least substantially the same coefficient of expansion so that in the operating state, that is, at very high temperatures, no additional material stresses due to a different expansion behavior of reinforcement element 8 on the one hand and rotary tube 1 on the other hand occur. Moreover, this improves the compatibility of the welding connection.

Furthermore, the invention can provide that for an optimized temperature control or for improving the cooling-off behavior of rotary tube 1, the optionally provided reinforcement element 8 is designed as a cooling element or cooling body. According to this embodiment, reinforcement element 8 can be additionally provided with cooling ribs that result on account of the surface enlargement in a better heat removal behavior of reinforcement element 8 and therewith of rotary tube 1.

The sectional enlargements (B) to (D) of FIG. 3 further illustrate the different possibilities of arrangement of reinforcement element 8 relative to mixing element 3 or to its fastening section 5.

Thus, sectional enlargement (B) of FIG. 3 shows an arrangement according to which fastening section 5 extends to a certain extent perpendicularly on both sides of reinforcement element 8 and reinforcement element 8 is therefore arranged, e.g., at least substantially centrally to fastening section 5 extending in the direction of the axis of rotation or longitudinal axis of rotary tube 1 or so to speak "crosses" fastening section 5. In order to ensure a flat resting of the inner surface of reinforcement element 8 on the outside of rotary tube 1, according to this embodiment reinforcement element 8 can comprise at least one notch 11 for receiving fastening section 5. Reinforcement element 8 of the invention can be permanently connected in the area of notch 11 to fastening section 5, e.g., by welding.

Sectional enlargement (C) of FIG. 3 shows an embodiment of the invention according to which reinforcement element 8 comprises an interruption or perforation in the area of fastening section 5. In this instance the cross sections of reinforcement element 8 rest to a certain extent flush on the longitudinal side of fastening section 5. A welding of the contact surfaces of reinforcement element 8 on the one hand and the fastening section 5 on the other hand can also be provided in this embodiment.

Finally, sectional enlargement (D) of FIG. 3 shows another arrangement in accordance with the invention of reinforcement element 8 on rotary tube 1 according to which annular reinforcement element 8 rests with its side wall on the short side of fastening section 5 of a mixing element 3. It can be provided in this instance that reinforcement element 8 is welded in the area of the contact point to fastening section 5. A recess of reinforcement element 8 can also be optionally provided in this embodiment (not shown).

The optionally provided fastening of reinforcement element 8 to fastening sections 5 of mixing elements 3 results in an additional stabilization of rotary tube 1 since the particular elements—reinforcement element 8 on the one hand and fastening section 5 or mixing element 3 on the other hand—so to speak, intermesh and additionally stabilize themselves to a certain extent. This also achieves in particular a stabilization of the mechanically heavily stressed mixing elements 3 so that this ensures an additional lengthening of the service life of the apparatus.

As FIG. 2A shows, reinforcement element 8 can also be connected to a plurality of mixing elements 3 or to their fastening sections 5. Thus, according to FIG. 2A reinforcement element 8 is connected to mixing elements 3 located above and below in the cross-sectional area.

Moreover, rotary tube 1 in accordance with the invention advantageously comprises inlet and outlet devices for introducing and discharging gases as well as for conducting gases through it, e.g., for introducing inert gases for the carbonization phase during the production of activated carbon and for introducing oxidation gases for the activation phase during the production of activated carbon. This is not shown in the figures.

For improved maintenance of inner space 2 of rotary tube 1, it can have a so-called manhole in the wall of the rotary tube, which manhole can be tightly closed against rotary tube 1 and thus allows entry of maintenance personnel to enter into inner space 2 of rotary tube 1 outside of operation. This is also not shown in the figures. In this manner maintenance of inner space 2 of rotary tube 1 is also readily achieved.

As previously described, rotary tube 1 in accordance with the present invention is used in particular in rotary tube kilns for the production of activated carbon. Therefore, subject matter of the present invention, according to a second aspect of the present invention, is a rotary tube kiln comprising previously described rotary tube 1 in accordance with the present invention.

Further subject matter of the present invention, according to a third aspect of the invention, is the use of a rotary tube 1 as previously described and of a rotary tube kiln containing this rotary tube for the production of activated carbon, and a process for the production of activated carbon by carbonization and subsequent activation of carbon-containing raw materials using the rotary tube and rotary tube kiln in accordance with the invention.

As was described in the introductory part of the present invention, the production of activated carbon generally takes place by carbonization (also synonymous with pyrolysis, low-temperature carbonization or coking) and subsequent activation of carbon-containing raw materials, especially organic polymers, e.g., sulfonated organic polymers (e.g., sulfonated divinylbenzene-crosslinked polystyrenes) that are carbonized in the rotary tube or rotary tube kiln in accordance with the present invention and are subsequently activated. The carbonization is generally carried out at temperatures of 100° C. to 750° C., especially 150° C. to 650° C., preferably 200° C. to 600° C., preferably under an inert or possibly slightly oxidizing atmosphere, as described in the introductory part. The carbonization can be preceded by a pre-carbonization or pre-low-temperature carbonization stage. On the other hand, the activation is generally carried out at temperatures of 700° C. to 1,200° C., especially 800° C. to 1,100° C., preferably 850° C. to 1,000° C. The carbonization is generally carried out, as is described in the introductory part, under controlled and/or selectively oxidizing conditions, especially under a controlled oxidizing atmosphere. Suitable initial polymers of the previously cited type that can be cited are, in particular, ion-exchange resins, or acidic ion exchange ions, preferably with sulfonic acid groups, thus, e.g., cation-exchange resins (e.g., cation-exchange resins based on sulfonated styrene/divinylbenzene copolymers) or their precursors (that is, non-sulfonated ion-exchange resins, which must be sulfonated before or during carbonization with a suitable sulfonation agent such as, e.g., sulfuric acid and/or oleum). Refer for further details in this regard to the above comments in the introductory part.

The rotary tube or rotary tube kiln of the present invention makes possible the production of activated carbon starting from suitable carbon-containing raw materials by carbonization and subsequent activation in a single apparatus with relatively easy manipulation. The design of the transitional area and of the special conception and arrangement of the turning sheets achieves a thorough axial mixing of the charge material, which results in homogenous and efficient final products, in particular in the form of activated carbon, since a uniform contact with the ambient atmosphere always results for the totality of the charge material so that local concentration gradients are minimized. In addition, a shortened activation time and therewith a shortened production time result, which results in savings in production costs. As a result of the good thorough mixing of the charge material, larger charge amounts, which can be more than 30% of the filling volume of the rotary tube, can be realized without adversely affecting the yield since, as previously described, the thorough axial mixing achieves a uniform contact of the charge material with the ambient atmosphere.

In addition, the external welding of the mixing elements makes a system available that is easy to maintain and not very temperature-sensitive that is suitable for resisting the extremely corrosive conditions of the carbonization phase as well as the high temperature conditions of the activation phase; the external welding of the mixing elements makes it possible to use welding materials that are optimally suited for the welding but cannot be readily used for interior welding since they would not readily permanently withstand the corrosive high temperature conditions in the interior of the rotary tube during the operating state.

The external attachment of the reinforcement element(s) significantly improves the mechanical stability and the shape stability of the rotary tube during operation, in particular even under extreme conditions like those occurring, e.g., in the production of activated carbon. In this manner a rotary tube is created that can better resist mechanical deformations, is more resistant to strong differences and fluctuations of pressure and is therefore shape-stable under operating conditions. The rotary tube in accordance with the invention consequently has an improved service life with a reduced tendency for premature material fatigue. Also, this facilitates the carrying-out of the process and process control.

Further advantages, embodiments, modifications, variations and qualities of the present invention are readily apparent and comprehensible for a person skilled in the art upon reading the specification without having to leave the scope of the present invention.

While the preferred embodiment of the invention has been illustrated and described in the drawings and foregoing description, the same is to be considered as illustrative and not restrictive in character, it being understood that all changes and modifications that come within the spirit of the invention are desired to be protected.

What is claimed is:

1. A rotary tube for a rotary tube kiln for the production of activated carbon, said rotary tube being constructed and arranged with a transitional area from a smaller inside cross section to a larger inside cross section of the rotary tube;
   a plurality of mixing elements arranged in the inner space of the rotary tube for a thorough mixing of a charged material, said mixing elements being constructed and arranged with a scoop-shaped form, wherein the mixing elements are inclined at least in sections to the longitudinal axis of the rotary tube, wherein the angle of incline of the mixing elements to the longitudinal axis of the rotary tube, relative to its two-dimensional projection plane, is selected as a function of the position of the mixing elements along the longitudinal axis of the rotary tube in such a manner that the mixing elements in the area of smaller inside cross section of transitional area have a smaller angle of incline than those mixing elements arranged in the direction of the larger inside cross section of the transitional area, and the mixing elements are formed in the transitional area and are arranged in such a manner that the charged material is transported during operation by the mixing elements toward the smaller inside cross section;
   wherein the rotary tube is provided on the outside with at least one reinforcement element for stabilizing the rotary tube during operation; and
   wherein the reinforcement element is designed in such a manner that the rotary tube is stabilized in its cross section and in its longitudinal extent and the reinforcement element extends peripherally around the rotary tube.

2. The rotary tube according to claim 1, wherein the transitional area is constructed and arranged with a conical form.

3. The rotary tube according to claim 1, wherein the transitional area extends over 10 to 90% of the total length of the rotary tube.

4. The rotary tube according to claim 1, wherein the transitional area extends over 30 to 70% of the total length of the rotary tube.

5. The rotary tube according to claim 1, wherein the transitional area includes an angle of inclination of the surface of the transitional area to the longitudinal axis of the rotary tube, relative to its two-dimensional projection plane, in a range of 1° to 15°.

6. The rotary tube according to claim 1, wherein the angle of incline is in a range of 5° to 20°.

7. The rotary tube according to claim 1, wherein the mixing elements have lengths, relative to their orientation to the longitudinal axis of the rotary tube, in a range of 1 mm to 500 mm.

8. The rotary tube according to claim 1, wherein the mixing elements have fastening sections and scoop sections.

9. The rotary tube according to claim 8, wherein the scoop sections have an angle in a range of 90° to 175°.

10. The rotary tube according to claim 8, wherein the rotary tube comprises perforations for receiving the fastening sections of the mixing elements and the fastening sections are welded to the rotary tube exclusively on its outside by a welding connection.

11. The rotary tube according to claim 1, wherein the mixing elements are welded on the outside to the rotary tube.

12. The rotary tube according to claim 1, wherein the rotary tube and the mixing elements consist of high-temperature and corrosion-resistant steel.

13. A process for the production of activated carbon by carbonization and the subsequent activation of carbon-containing raw materials, in which the process is carried out in a rotary tube according to claim 1.

14. A rotary tube kiln for the production of activated carbon, comprising a rotary tube, said rotary tube being constructed and arranged with a transitional area from a smaller inside cross section to a larger inside cross section of the rotary tube;
   a plurality of mixing elements arranged in the inner space of the rotary tube for a thorough mixing of a charged material, said mixing elements being constructed and arranged with a scoop-shaped form, wherein the mixing elements are inclined at least in sections to the longitudinal axis of the rotary tube, wherein the angle of incline of the mixing elements to the longitudinal axis of the rotary tube, relative to its two-dimensional projection plane, is selected as a function of the position of the mixing elements along the longitudinal axis of the rotary tube in such a manner that the mixing elements in the area of smaller inside cross section of transitional area have a smaller angle of incline than those mixing elements arranged in the direction of the larger inside cross section of the transitional area, and wherein the mixing elements are formed in the transitional area and are arranged in such a manner that the charged material is transported during operation by the mixing elements toward the smaller inside cross section;

wherein the rotary tube is provided on the outside with at least one reinforcement element for stabilizing the rotary tube during operation; and wherein the reinforcement element is designed in such a manner that the rotary tube is stabilized in its cross section and in its longitudinal extent and the reinforcement element extends peripherally around the rotary tube.

15. A rotary tube for a rotary tube kiln for the production of activated carbon, said rotary tube being constructed and arranged with a transitional area from a smaller inside cross section to a larger inside cross section of the rotary tube;

a plurality of mixing elements arranged in the inner space of the rotary tube for a thorough mixing of a charged material, said mixing elements being constructed and arranged with a scoop-shaped form, wherein the mixing elements are inclined at least in sections to the longitudinal axis of the rotary tube, wherein the angle of incline of the mixing elements to the longitudinal axis of the rotary tube, relative to its two-dimensional projection plane, is selected as a function of the position of the mixing elements along the longitudinal axis of the rotary tube in such a manner that the mixing elements in the area of smaller inside cross section of transitional area have a smaller angle of incline than those mixing elements arranged in the direction of the larger inside cross section of the transitional area, and the mixing elements are formed in the transitional area and are arranged in such a manner that the charged material is transported during operation by the mixing elements toward the smaller inside cross section;

wherein the rotary tube is provided on the outside with at least one reinforcement element for stabilizing the rotary tube during operation; and wherein the reinforcement element is arranged coaxially to the rotary tube and the reinforcement element is welded to the rotary tube by a welding connection.

16. A rotary tube for a rotary tube kiln for the production of activated carbon, said rotary tube being constructed and arranged with a transitional area from a smaller inside cross section to a larger inside cross section of the rotary tube;

a plurality of mixing elements arranged in the inner space of the rotary tube for a thorough mixing of a charged material, said mixing elements being constructed and arranged with a scoop-shaped form, wherein the mixing elements are inclined at least in sections to the longitudinal axis of the rotary tube, wherein the angle of incline of the mixing elements to the longitudinal axis of the rotary tube, relative to its two-dimensional projection plane, is selected as a function of the position of the mixing elements along the longitudinal axis of the rotary tube in such a manner that the mixing elements in the area of smaller inside cross section of transitional area have a smaller angle of incline than those mixing elements arranged in the direction of the larger inside cross section of the transitional area, and the mixing elements are formed in the transitional area and are arranged in such a manner that the charged material is transported during operation by the mixing elements toward the smaller inside cross section; and wherein the rotary tube comprises inlet and outlet devices for introducing and discharging gases as well as for conducting gases through it.

* * * * *